Patented Jan. 4, 1949

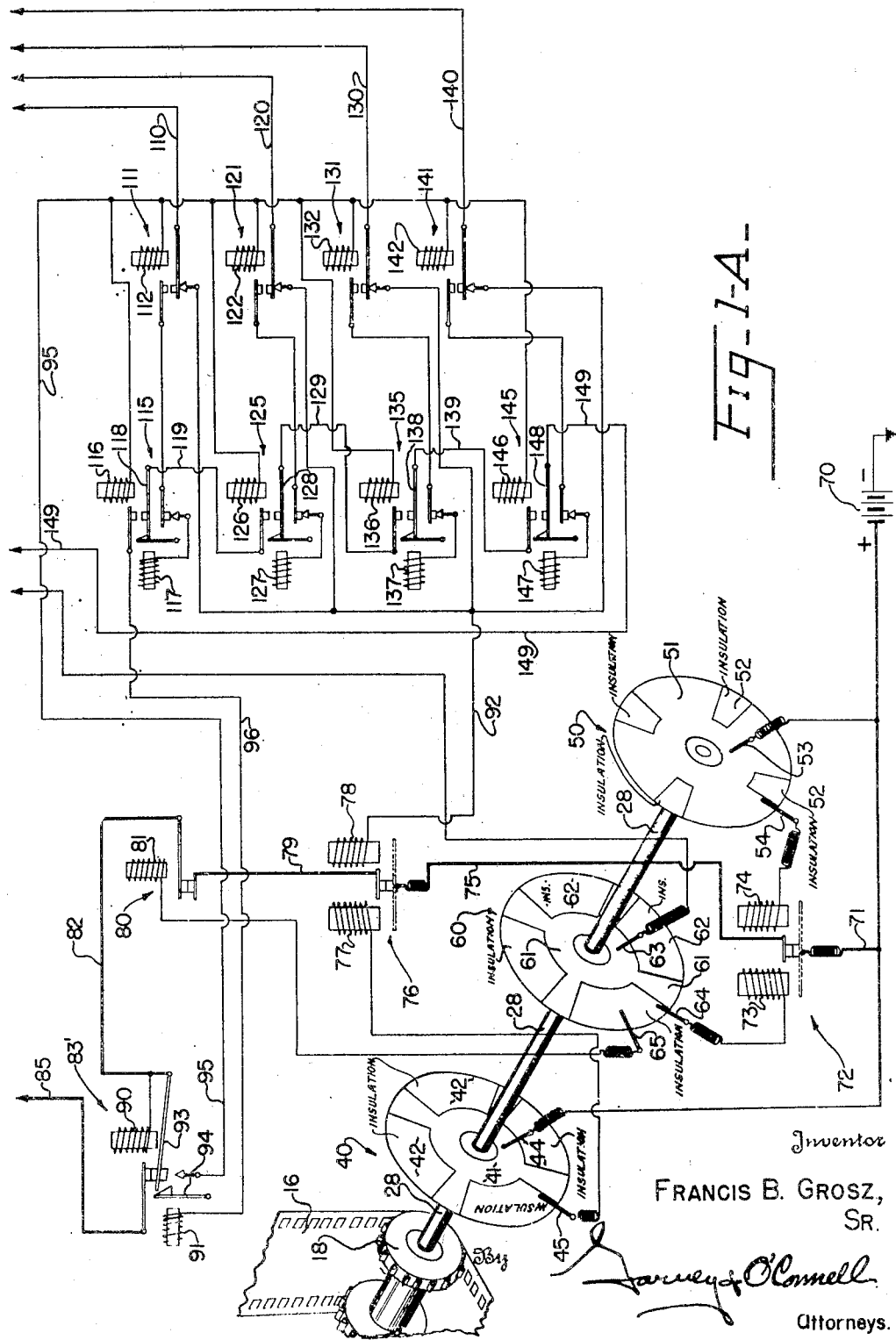

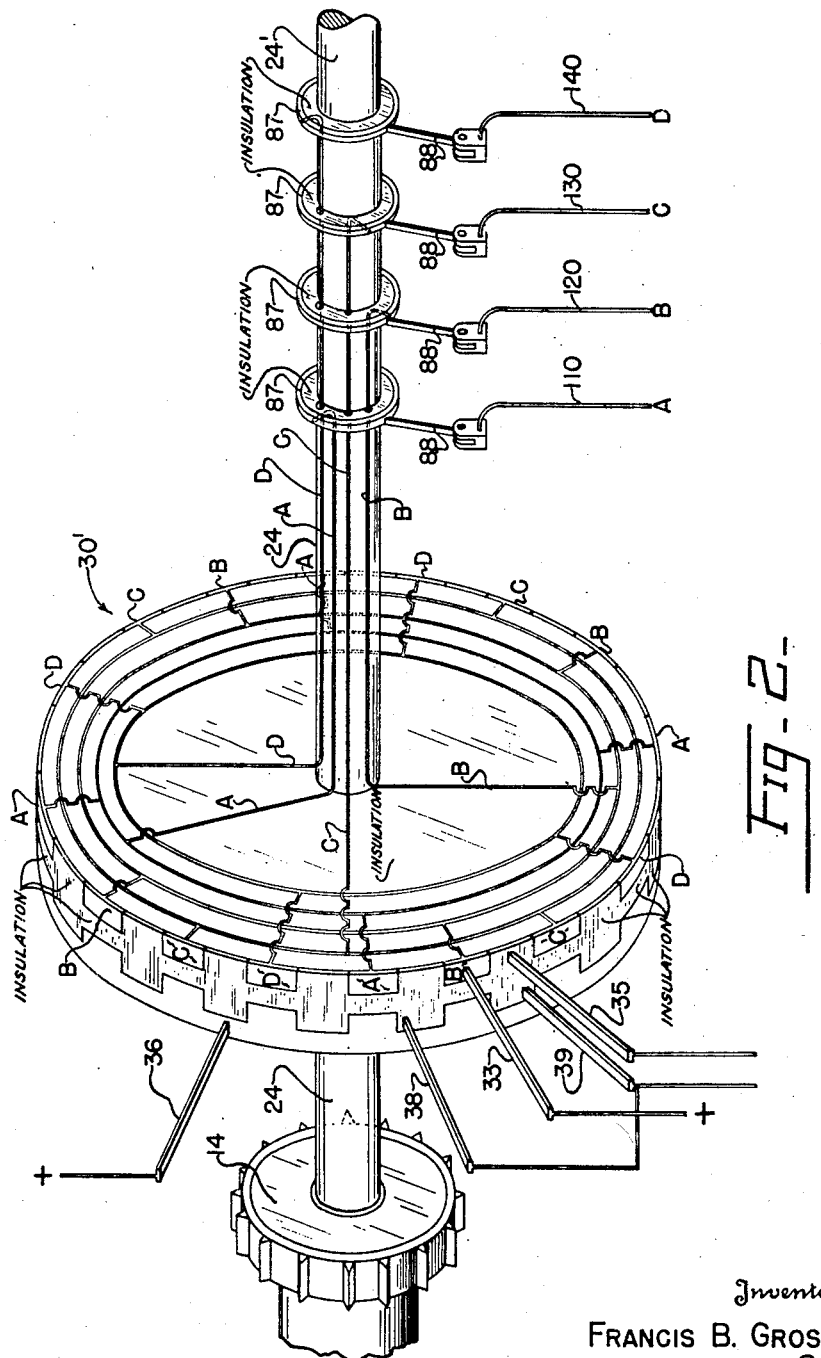

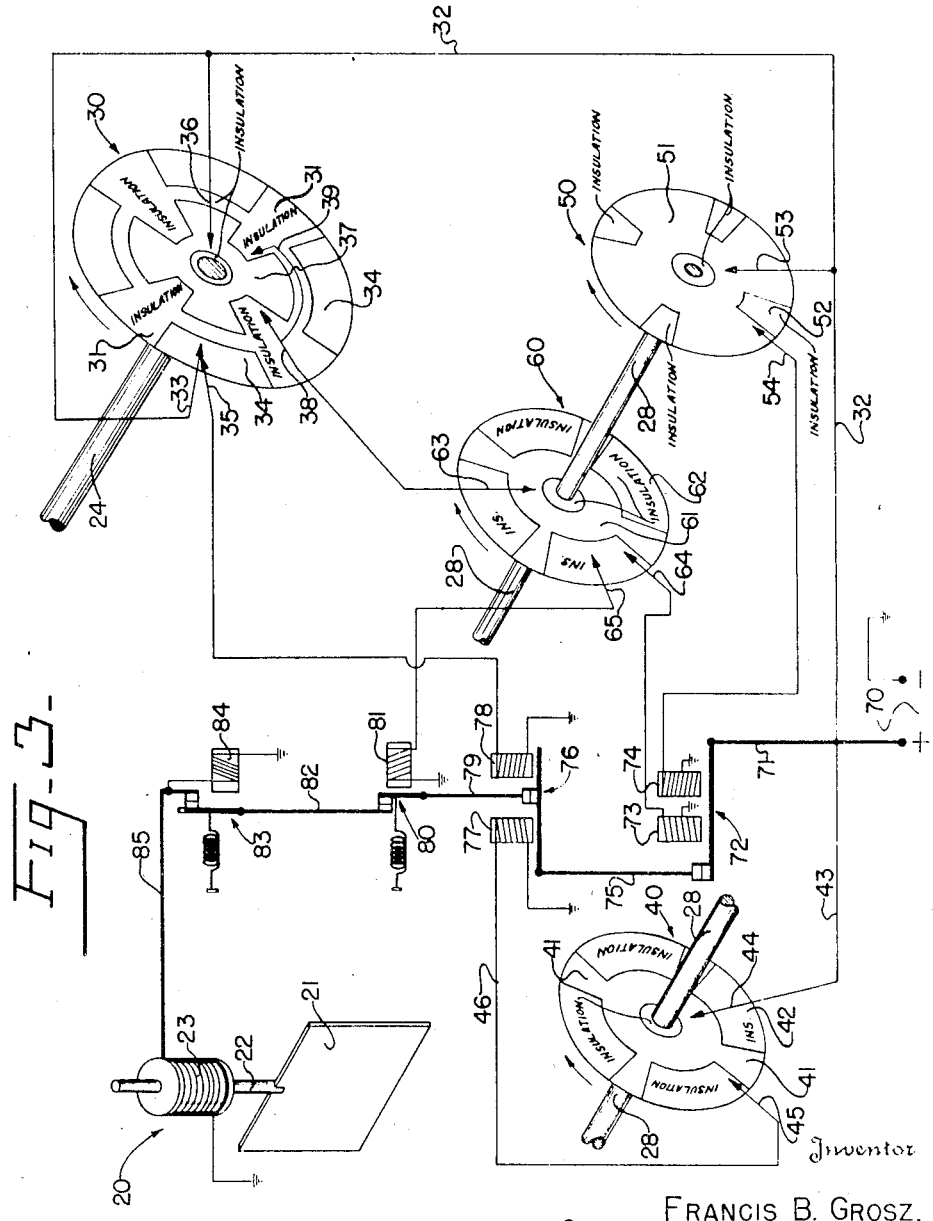

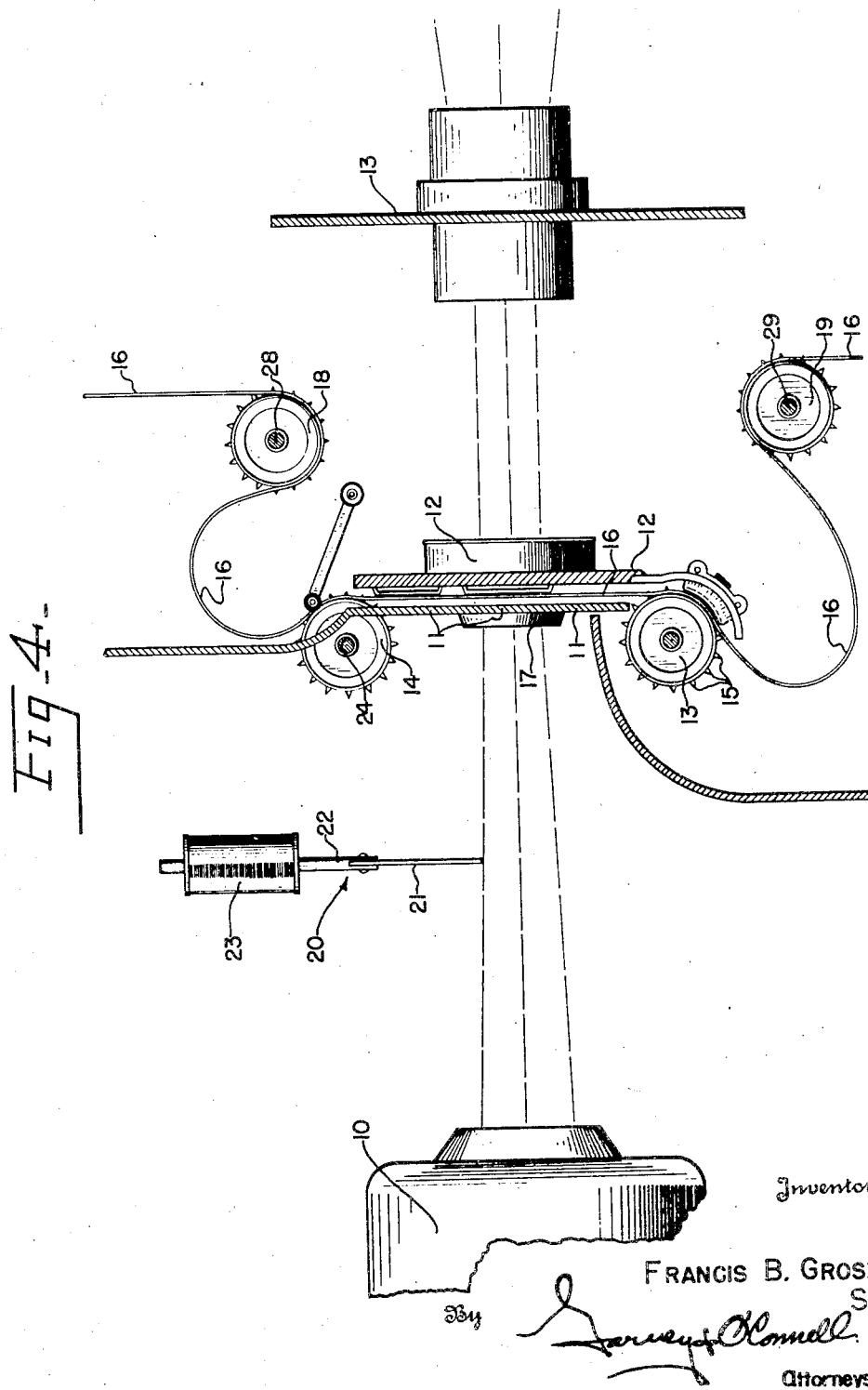

2,458,161

UNITED STATES PATENT OFFICE 2,458,161

SYSTEM FOR PREVENTING FILM FIRE IN MOTION-PICTURE PROJECTORS

Francis B. Grosz, Sr., New Orleans, La.

Application February 17, 1948, Serial No. 8,886

5 Claims. (Cl. 88—17)

The invention has particular reference to a system for preventing film fire in a motion picture projector by automatically inserting a dowser plate or shutter between the light source and the film strip, but may be used with equal facility for automatically stopping a motion picture camera when the film strip breaks.

In the operation of a motion picture projector, if the film for any reason comes to rest, the intense light from the projecting source remains focused on the stationary film and soon generates enough heat on the film to cause it to burst into flame. It has been the practice to depend on the vigilance of the projection machine operator to shut off the light whenever any difficulty is experienced and before the film gets hot enough to catch fire.

The motion of the film past the aperture may be arrested, and therefore present a fire hazard, as a result of several kinds of failure. One is the stoppage of the projector mechanism. Breakage of the film is a more common type of failure. Sometimes the film tears longitudinally so that a strip of the film "piles up" in the projector and presents a serious fire hazard.

It is therefore the principal object of this invention to provide an automatic system for interrupting the projection beam of light whenever a failure occurs that would result in a film fire hazard.

In persuance of this object and many other objects that will be apparent to those skilled in the art, I provide a control means which is responsive to the several possible types of failure, and which is operative to release a dowser to block the path of the projection light. Projectors are commonly operated in pairs so that when the end of the reel of film is reached on one machine, the other machine carrying the following reel may be immediately put into operation without any interruption of the image on the screen. Since the sources of light used in projectors do not lend themselves to being quickly extinguished, it is the practice to use a solenoid-operated "change-over dowser" as a shutter when changing over from one machine to the other. By employing the change-over dowser, my invention may be added to projection machines within a minimum of expense and trouble compared with the value of the fire protection obtained.

Briefly, my invention contemplates providing a disk or cylinder having electrical contact segments thereon, the disk or cylinder being driven by an idling film sprocket disposed in the projector mechanism and rotated with a jerky motion by the film. At least one other segmented disk or cylinder is provided and driven at constant speed by the projector's upper feed sprocket or lower take-up sprocket. Brushes riding on the segmented disks or cylinders are connected and arranged in such a way, in conjunction with relays, that improper operation on the machine, as when the film breaks, is immediately detected and the solenoid-operated dowser is de-energized. The beam of light is thus interrupted and the danger of film fire is eliminated.

Referring briefly to the drawings wherein I show application of my invention,

Figures 1 and 1A are a schematic diagram of one form of the invention;

Figure 2 is a perspective view showing a mechanical structure for one of the rotary switches used in the invention;

Figure 3 is a simplified schematic alternate diagram of the invention, and

Figure 4 is a diagrammatic elevational view of the essential parts of a motion picture projector with which the invention is used.

Figure 1:
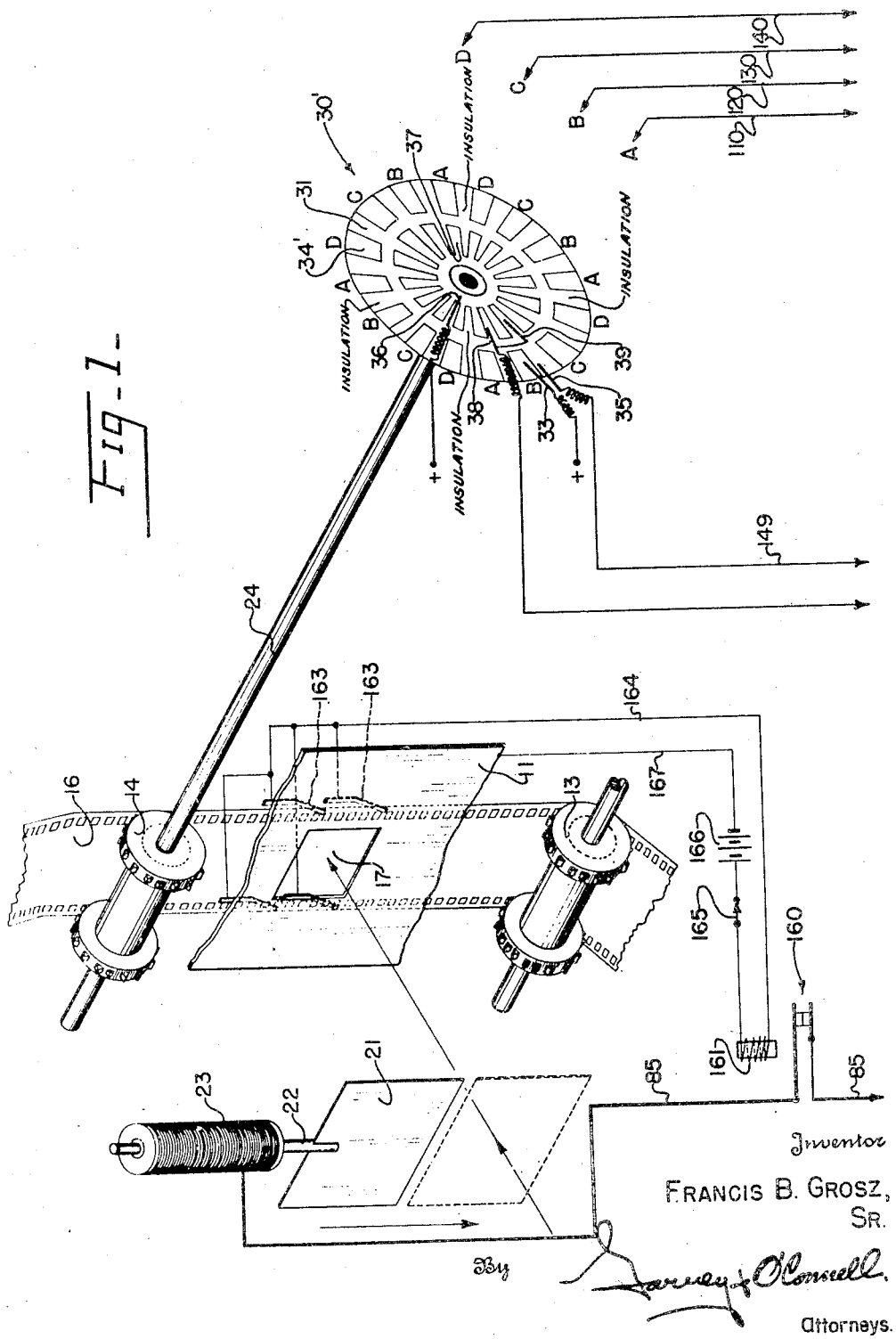

Referring now in greater detail to the drawings, a basic preliminary understanding of the invention can best be obtained from an explanation of Figures 3 and 4. Figure 4 shows a standard motion picture projector having a source of light 10, film trap 11, film trap door 12, and lens system 13. The film trap 11 is provided with a driven intermittent motion sprocket wheel 13 and an idling sprocket wheel 14 on shaft 24. These sprocket wheels have sixteen teeth 15 or each end for engagement with corresponding holes on the sides of the film 16. The intermittent sprocket wheel 13 is driven with a jerky motion moving a quarter of a revolution each time, or to an extent corresponding to the distance between centers of successive picture frames on the film. Wheel 13 draws the film past the aperture 17 on the film trap 11 at the rate of about 21 frames per second.

The film 16 drawn by intermittent sprocket 13 passes over idling sprocket 14 and imparts the same intermittent motion thereto—so long as the film between the two sprockets is not broken.

While the intermittent sprocket wheel 13 draws the film past the aperture one frame at a time, the upper feed sprocket 18 on shaft 28 and the lower take-up sprocket 19 are driven at a continuous rate and make one complete revolution in the same time that the intermittent sprocket 13 and idling sprocket 14 make a complete revolution in four jerks.

A dowser, generally designated 20, consists of a shutter plate 21 secured to an armature 22, one end of which is free to reciprocate axially in solenoid 23. When energized, solenoid 23 holds the shutter plate 21 up, and when de-energized, the shutter plate is allowed to fall into the path of light between the source 10 and the film 16. The electrical system, to be described, is operative to keep the solenoid 23 energized until through some failure of the projector or breakage of the film, a film fire hazard is created.

Referring now to Figure 3 which is a highly simplified form of the invention, shaft 24 is the shaft carrying the idling sprocket wheel 14 of Figure 4, and broken shaft 28 is the shaft carrying the upper feed sprocket 18 of Figure 4. The shaft 29 of Figure 4 carrying lower take-up sprocket 19 may be employed in place of shaft 28 if desired.

Shaft 24 has secured to the end thereof a rotary contact disk, generally designated 30, having a plurality of contact segments thereon separated by an insulating material 31. Disk 30, being connected by shaft 24 to idling sprocket 14, moves a quarter of a revolution at a time corresponding with the movement of the film from one frame to the next.

Shaft 28 has secured thereto three rotary contact disks generally designated 40, 50 and 60, having contact areas 41, 51 and 61, respectively, and insulating areas 42, 52 and 62, respectively. Disks 40, 50 and 60, being connected to shaft 28, rotate with a continuous motion making one revolution for each four quarter revolutions of disk 30.

It is to be understood that all the solenoids in the drawings are provided with electrical returns to the source by ground or wires, which returns have been omitted from the drawings in order to avoid crowding and confusion.

Electricity is supplied to dowser 20 from the positive side of source 70 through wire 71, relay 72, wire 75, relay 76, wire 79, relay 80, wire 82, relay 83 and wire 85, and back through ground to the negative side of source 70. During normal operation of the projector, the relays remain in closed position as shown and solenoid 23 of dowser 20 remains energized.

During normal operation, relay 76 is kept in the closed position as follows: When disk 30 is at rest between motions, current is supplied from source 70 through wire 32, brush 33, contact sector 34, and brush 35 to solenoid 78. When disk 30 makes a rapid quarter revolution, disk 40 has rotated a fraction of a revolution from the position shown in Figure 3, and current is supplied from source 70 through wire 43, brush 44, contact plate 41, brush 45, and wire 46 to solenoid 77. The segments of contact plate 41 cause the relay 76 to be energized whenever disk 30 is in motion and not energizing relay 76. If the film strip 16 breaks and disk 30 comes to rest with brushes 33 and 35 on the insulating portion 31 of the disk, current will not be allowed to pass from the source 70 to solenoid 78, relay 76 will open, and dowser solenoid 23 will be de-energized thereby allowing the shutter plate 21 to fall into the path of the light beam and prevent the film from catching fire.

On the other hand, if the film breaks and disk 30 comes to rest with brushes 33 and 35 resting on one of the contact segments 34, current will continue to pass from the source 70 to solenoid 78 and relay 76 will remain closed. Under these conditions the dowser solenoid 23 would not be de-energized. Relay 72 and disks 50 and 60 provide for such a contingency in the following manner: Disks 50 and 60 are on the same shaft 28 as disk 40 and rotate at constant speed. Current is supplied from source 70 through wire 32, brush 53, contact plate 51 and brush 54 to solenoid 74 at all times except when brush 54 is on an insulating segment 52, i. e., at all times that disk 30 is rotating or should be rotating. If disk 30 has come to rest in a position such as shown, relay 72 will be de-energized when insulating segment 52 of disk 50 passes under brush 54 and dowser solenoid 23 will be de-energized thus cutting off the beam of light.

Under normal conditions of operation (when the film strip is unbroken) relay 72 will be kept energized during the time that insulating segment 52 is under brush 45 by the flow of current from source 70, through wire 32, brush 36, contact plate 37, brush 38, brush 63, contact plate 61 and brush 64 to solenoid 73 of relay 72.

If, as the result of breakage of the film, disk 30 came to rest in a position such that contact segment 34 was under brushes 33 and 35 and at the same time contact segment 37 was under brush 38, the dowser would not be de-energized. To take care of this possibility, a brush 65 was provided riding on disk 60 and connected to solenoid 81 of relay 80. Brush 65 is displaced from brush 64 and when contact plate 61 comes around under brush 65, current is allowed to flow from source 70, through wire 32, brush 36, contact plate 37, brush 38, brush 63, contact plate 61 and brush 65 to solenoid 81. When solenoid 81 is thus energized, relay 80 opens the circuit to the dowser solenoid 23 and the dowser shutter 21 interrupts the beam of light. It is to be noted that during normal operation, relay 81 is not actuated because brush 38 on disk 30 is not in contact with contact plate 37 at the same time that brush 65 on disk 60 is in contact with contact plate 61.

It is to be noted that brush 38 has associated therewith a brush 39 which is spaced from brush 38 by an amount slightly greater than the width of contact segment 37. Therefore, contact is made by brush 38 or 39 after only a small amount of rotation of disk 30.

Relay 83 is inserted in the circuit to the dowser solenoid 23 and is provided with a holding coil 84 connected on one side to wire 85 and on the other side to ground. Relay 83 is provided for the purpose of permanently opening the circuit to the dowser solenoid 23 whenever any one of relays 72, 76 and 80 is momentarily opened. Without relay 83, the dowser solenoid 23 would be alternately energized and de-energized after a breakage of the film by reason of the opening and closing of relay 76 as disk 40 continued to rotate. In the embodiment of the invention shown in Figures 1 and 1A, provisions are made for automatically re-setting relay 83.

The embodiment of the invention shown in Figures 1 and 1A is similar to the simplified embodiment previously described and shown in Figure 3 with the following exceptions: Disk 30' is divided into sixteen contact segments, one corresponding to each tooth of the standard film sprocket wheel; a system of relays is inserted electrically between disk 30' and relay 76; relay 83' is provided with resetting means, and means are provided for de-energizing the dowser when the film tears longitudinally in such a way that the sprocket wheels continue to rotate in the normal way.

In the just mentioned Figures 1 and 1A, disk 30' is shown diagrammatically to be divided into an outer ring of sixteen segments 34' which are designated, in order, A, B, C, D, A, B, etc. The four segments designated A are in contact with wire A. The other segments are similarly connected to wires B, C and D. An inner row of sixteen contact segments 37' are all connected together in the center. Reference should be made to Figure 2 for a structural form of disk 30' having the contact segments arranged on the peripheral edge of the disk segments 34' and connected by wires to slip rings 87 on a shaft extension 24'. Brushes 88 maintain electrical connection between the slip rings and wires A, B, C and D as the disk 30' rotates.

During normal operation, contact disk 40 maintains relay 76 energized when disk 30' is making one of its quarter revolutions. When disk 30' is at rest between movements, as in the position shown, current flows from the positive source through brush 33, contact segment B, wire 120, relay 121, and wire 92 to solenoid 78 of relay 76. After the next quarter revolution of disk 30', brush 33 will be in contact with the next successive segment B, and so on.

In the event that film failure causes the opening of one of relays 72, 76 or 80, solenoid 90 of relay 83' will be de-energized and armature 93 will fall to its lower position under pawl 94 and in contact with wire 95. When the film failure has been rectified and the projector is again put in operation, relay 83' will be automatically reset in the following way: Current is supplied from source 70 through the various relays, wire 92, solenoid 90 and also through armature 93 and wire 95 to solenoids 112, 116, 122, 126, 132, 136, 142 and 146. As a result of the energizing of relays 111, 121, 131 and 141, pulses of current are supplied during the next quarter revolution of disk 30' from four segments A, B, C and D, through wires 110, 120, 130 and 140, respectively, to pawl solenoids 117, 127, 137 and 147, respectively. Armatures 118, 128, 138 and 148 are then free to be drawn upwardly allowing current to flow during the next rotation of disk 30' from the source through brush 33, segment B (or A, C or D), brush 35, wire 149, armature 148, wire 139, armature 138, wire 129, armature 128, wire 119, armature 118 and wire 96 to pawl solenoid 91. Pawl 94 then releases armature 93 and allows it to be drawn up by solenoid 90 thereby again completing the circuit to the dowser solenoid 23.

In the operation of a motion picture projector, the film sometimes begins to tear transversely and then continues to tear longitudinally down the middle. Under these conditions, the perforations on one side of the film strip remain in engagement with the teeth on the corresponding side of the sprocket wheels and sprocket wheel 14 continues to rotate with the normal intermittent motion. Relay 160 is inserted in the wire 85 going to the dowser solenoid 23 for the purpose of de-energizing the dowser when the film tears longitudinally. Metallic spring fingers 163 are disposed in such a way that the film strip passes between the film trap 11 and the fingers 163, thereby insulating the fingers from the film trap during normal operating conditions. Fingers 163 are connected by wire 164 through solenoid 161 of relay 160, and through switch 165 to source of electricity 166. Film trap 11 is connected by wire 167 to source of electricity 166. Whenever the film tears, electrical contact is made between the fingers 163 and film trap 11, thereby energizing relay 160 and de-energizing dowser solenoid 23. It may be observed that if the power supply 70 is the same power supply used to drive the projector or camera, a failure of the power supply automatically releases the shutter 21.

It is apparent that I have provided a foolproof means for de-energizing the dowser solenoid whenever there is a failure of any kind that causes the film or a portion thereof to remain stationary in the path of light from the source.

My invention may also be applied to electrically driven motion picture cameras, for the purpose of automatically stopping the camera before a large amount of film is destroyed by tearing. This is so because cameras have idling and constant speed sprockets which operate in the same way as sprockets in projectors, and hence the invention may be used with facility and in a manner believed obvious to interrupt the source of electricity to a camera when there is a film failure for the purpose just stated.

While I have described and illustrated specifically the invention, it is to be understood that various changes may be made in the invention, within the scope of the appended claims.

What I claim is:

1. In a motion picture projector having a solenoid-operated change-over dowser, a control circuit for preventing film fire comprising a rotary switch driven by the idling film sprocket of the projector, a second rotary switch driven by a constant speed film sprocket of the projector, a source of electricity for energizing the solenoid-operated dowser, and relay means responsive to the relative rotation of said rotary switches and operative to interrupt said source of electricity for the dowser.

2. In a motion picture projector, an apparatus for preventing film fire comprising a solenoid-operated dowser and a source of electrical energy therefor, switch means operated by the idling film sprocket of the projector, a second switch means operated by a constant speed film sprocket of the projector, and means responsive to the cyclical operation of said switches and operative to interrupt the energy to the dowser when the cycle of operation is changed.

3. In a motion picture projector having a solenoid-operated dowser and a source of electricity therefor, a control means for said dowser comprising a rotary switch driven by the idling film sprocket of the projector, the idling sprocket being driven with an intermittent motion by the film strip, a second rotary switch driven at constant speed by a contant speed film sprocket of the projector, the second switch being operative in conjunction with the first to interrupt the current from the source to the dowser when a film failure stops the synchronized rotation of the first switch.

4. In a motion picture projector having a solenoid-operated dowser and an electrical source therefor, a control for the dowser comprising a rotary member driven by the idling sprocket wheel of the projector and having a plurality of contact segments, a second rotary member driven by a constant speed sprocket of the projector and having a plurality of contact segments, and means including brushes riding on the rotary members for actuating the dowser when the rotary members get out of synchronism as a result of film failure.

5. In a motion picture machine operated from a source of electricity, a control circuit for interrupting the source of electricity comprising rotary switch means driven by the idling film sprocket of the machine, a second rotary switch means driven by a constant speed film sprocket in the machine, and means responsive to the cyclical operation of said switches and operative to interrupt the source of electricity to the machine when film strip failure stops the normal cyclical operation of said switches.

FRANCIS B. GROSZ, Sr.

REFERENCES CITED

The following references are of record in the file of this patent:

UNITED STATES PATENTS

| Number | Name | Date |
|---|---|---|
| 1,502,434 | Lick | July 22, 1924 |
| 1,799,154 | Brook | Apr. 7, 1931 |
| 1,954,844 | Scheinfeld | Apr. 17, 1934 |
| 2,136,322 | Sebastiani | Nov. 8, 1938 |

FOREIGN PATENTS

| Number | Country | Date |
|---|---|---|
| 278,704 | Italy | Apr. 30, 1929 |